April 16, 1935.  W. BAUERSFELD  1,998,216

MICROSCOPE STAGE

Filed Nov. 12, 1934

Inventor:
Walther Bauersfeld.

Patented Apr. 16, 1935

1,998,216

UNITED STATES PATENT OFFICE 1,998,216

MICROSCOPE STAGE

Walther Bauersfeld, Jena, Germany, assignor to the firm of Carl Zeiss, Jena, Germany Application November 12, 1934, Serial No. 752,621
In Germany November 13, 1933

4 Claims. (Cl. 88—39)

As a rule, the usual microscopes are provided with a device from which is suspended a microscope condenser, this device being so disposed at the lowerside of the stage or at that part of the stand which is below the stage that exchanging the condenser at the microscope for another can be effected by removing the condenser from the said device by taking it out downwardly, and by inserting the said other condenser from below. This kind of exchange is not very advantageous on account of an illuminating mirror being generally disposed on the stand and below the condenser.

The invention concerns an object stage for microscopes which is provided with a condenser and overcomes the said inconvenience and which, when given a suitable form, makes it possible to use one single additional constructional element for the attachment of the condenser. The new microscope stage is therefore especially simple as compared to the known microscope stages. According to the invention, the object stage is provided with a surface stopping upward axial displacements of the used condenser and with holding elements preventing lateral displacements of the condenser. Only one of the holding elements is movable on the object stage and at least that holding part of the condenser which corresponds to this holding element represents a surface so inclined relatively to the condenser axis that the holding pressure has not only a component at right angles to but also an upward component parallel to the axial direction. The holding surface may have any shape, the object stage being preferably provided with a plane surface at right angles to the condenser axis. Those holding parts for the condenser which correspond to the stationary holding parts may be simply constructed as parts of a common cylindrical surface. It is also possible to construct all holding parts as parts of a common surface, suitably of a conical surface. In all these cases, the holding surfaces may be provided on the condenser itself, that is to say on the mount of the condenser, or use may be made of a sleeve which has corresponding holding surfaces and into which the condenser can be introduced. In the latter case, the microscope provided with the new object stage may be readily provided with the condensers usually to be had in commerce.

Figure 1:
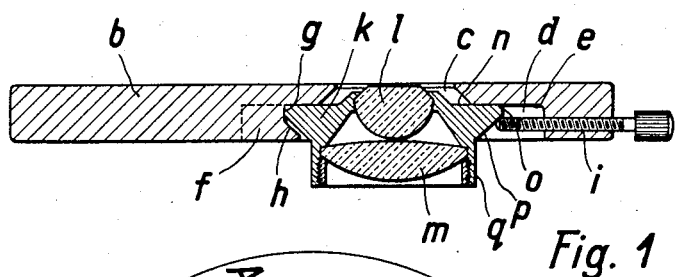
Figure 2:
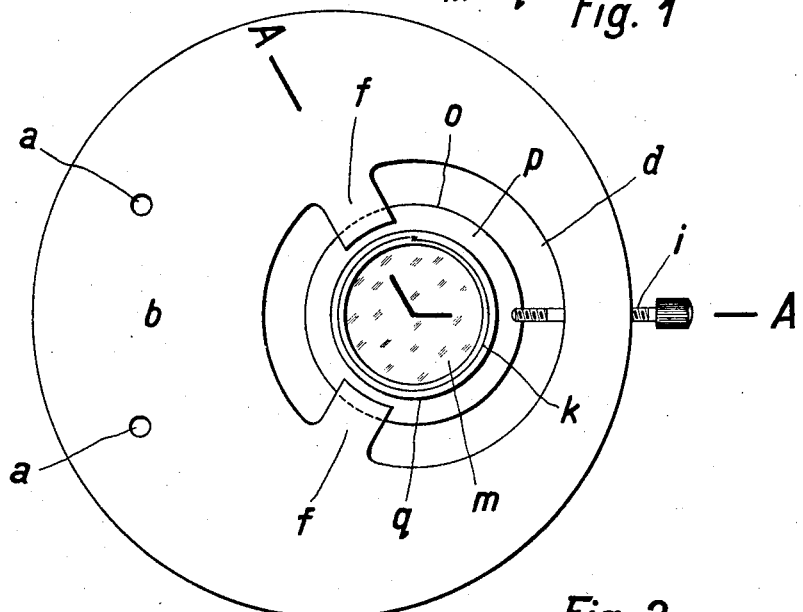

The accompanying drawing represents two constructional examples of the invention. Figure 1 shows a constructional example in elevation and in section through the line A—A in Figure 2, Figure 2 represents a view of this constructional example from below, and Figure 3 illustrates another constructional example in elevation and in a section corresponding to that according to Figure 1.

Both constructional examples are provided with a round object stage $b$ having screw holes $a$. In the stage $b$ is provided an illumination aperture $c$. Below this aperture $c$ is a concentric recess $d$ which is bounded above by a plane surface $e$ parallel to the surface of the stage. In the example according to Figures 1 and 2, two projecting parts $f$ extend into the recess $d$. The upper portions of the interior surfaces of the parts $f$ represent surfaces $g$ of a cylinder concentric to the recess $d$, and the corresponding lower portions are surfaces $h$ of a cone concentric to the recess $d$. Opposite the projecting parts $f$, the recess $d$ is provided with a screw $i$ whose axis is parallel to the surface of the stage and which is screwed into the object stage $b$. The condenser to be attached to the object stage $b$ has a mount $k$ and two lenses $l$ and $m$. Three of the surfaces of the mount $k$ are bearing surfaces, namely the annular surface $n$ at right angles to the condenser axis, the cylindrical surface $o$ corresponding to the surface $g$ and the conical surface $p$ in connection with a cylindrical surface $q$.

The object stage $b$ is attached to the microscope by means of the screw holes $a$ and the condenser and its mount $k$ are so introduced into the aperture $o$ in the object stage $b$ that the cylindrical surface $o$ lies on the cylindrical surfaces $g$ of the supports $f$ and that the plane surface $n$ rests against the surface $e$ of the object stage. The screw $i$ is so screwed into the recess $d$ that its end touches the conical surface $p$ of the condenser, the consequence being that, at the point of contact, a component of the bearing pressure acts upon the condenser at right angles to the condenser axis and a component parallel to this axis acts upwardly upon the condenser, which means that the condenser is firmly held in its position for use. When the condenser is introduced into, or removed from, the object stage $b$, this condenser is moved in a direction only slightly inclined relatively to a horizontal line. The usual introduction from below upwardly and the removal in the reverse sense are thus avoided, and the change of condensers is very simple. When the screw $i$ is unscrewed, the condenser cannot fall from the object stage, because the conical surface $p$ of the frame $k$ lies against the conical surface $h$ as soon as the surfaces $o$ and $g$ do not touch each other any longer. As a consequence, the condenser is still held in position.

Figure 3:
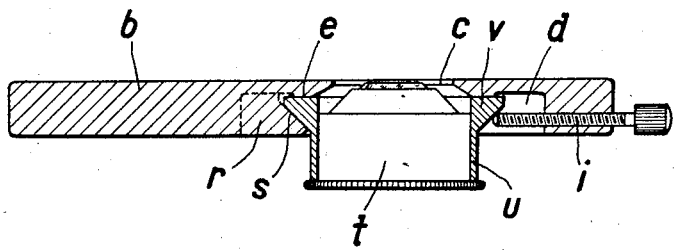

In the constructional example illustrated by Figure 3, two projecting parts r extend into the recess d, the interior surfaces s of these projecting parts being conical. In the construction corresponding to that according to Figure 1, a screw i is provided in the object stage b. The condenser t of the example according to Figure 3, which is a condenser of the form generally used for microscopic illuminations, is introduced into a sleeve u having a projecting conical piece v which corresponds to the conical surfaces s.

When using the device, the condenser t provided with the sleeve u is introduced into the aperture c of the object stage b and attached by means of the screw i, which introduction and attachment correspond to those according to the example illustrated by Figures 1 and 2. In this position for use, the upper surface of the piece v lies against the plane surface e of the stage b, and the conical surface of the piece v rests against the surfaces s of the parts r.

I claim:

1. An object stage for microscopes, comprising a stage plate, this plate having an aperture for the passage of light, a microscope condenser below the said aperture and attached to the said plate, a stopping surface provided on the lower side of the said plate and adapted to prevent upward displacements of the said condenser in the direction of the axis of this condenser, a plurality of holders on the lower side of the said plate and adapted to prevent displacements of the said condenser in directions at right angles to the axis of this condenser, one of the said holders being displaceably mounted on the plate and the other holders being rigidly connected to the said plate, at least that part of the said condenser which corresponds to the said movable holder being provided with a holding surface inclined relatively to the axis of the said condenser, the distance of the lower part of this inclined holding surface from the axis of the said condenser being smaller than the distance of the upper part of this surface from the said axis.

2. In an object stage according to claim 1, the said microscope condenser consisting of two parts detachably connected to each other, one of these parts being tubular and surrounding the other part.

3. In an object stage according to claim 1, the said stopping surface being plane and at right angles to the axis of the said microscope condenser, and those parts of this condenser which correspond to the said stationary holders being provided with holding surfaces, the said parts being parts of a cylindrical surface, the axis of this cylindrical surface being identical with that of the said condenser.

4. In an object stage according to claim 1, the said stopping surface being plane and at right angles to the said microscope condenser, and those parts of this condenser which correspond to the said holders being provided with holding surfaces which are parts of a conical surface, the axis of this conical surface being identical with that of the said condenser.

WALTHER BAUERSFELD.